US010296183B1

(12) United States Patent
Peyras et al.

(10) Patent No.: US 10,296,183 B1
(45) Date of Patent: May 21, 2019

(54) AIRCRAFT ASSEMBLY TRACKER SYSTEMS AND METHODS

(71) Applicant: Airbus Operations (S.A.S.), Toulouse (FR)

(72) Inventors: Laurent Peyras, La Salvetat Saint Gilles (FR); Michel Colombier, Aucamville (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/821,429

(22) Filed: Nov. 22, 2017

(51) Int. Cl.

| G06F 3/048 | (2013.01) |
| G06F 3/0484 | (2013.01) |
| G06F 3/0482 | (2013.01) |
| G05B 19/418 | (2006.01) |
| B64F 5/10 | (2017.01) |
| H04L 29/08 | (2006.01) |

(52) U.S. Cl.
CPC ............ G06F 3/0484 (2013.01); B64F 5/10 (2017.01); G05B 19/41875 (2013.01); G06F 3/0482 (2013.01); G05B 2219/32368 (2013.01); G05B 2219/45067 (2013.01); H04L 67/12 (2013.01)

(58) Field of Classification Search
CPC .......................... G06F 2221/034; G06F 3/0481
See application file for complete search history.

(56) References Cited

U.S. PATENT DOCUMENTS

| 9,182,892 B2 | 11/2015 | Senesac | |
| 2011/0179371 A1* | 7/2011 | Kopycinski | G06Q 10/10 715/772 |
| 2014/0282183 A1* | 9/2014 | Senesac | B64F 5/10 715/771 |
| 2016/0328092 A1* | 11/2016 | Bakos | G06F 3/0483 |
| 2018/0173197 A1* | 6/2018 | Bendert | G01M 15/14 |

OTHER PUBLICATIONS

Digitisation of a moving assembly operation using multiple depth imaging sensors, Vinayak Ashok Prabhu, Oct. 9, 2015.*

* cited by examiner

Primary Examiner — William L Bashore
Assistant Examiner — Rayeez R Chowdhury
(74) Attorney, Agent, or Firm — Jenkins, Wilson, Taylor & Hunt, P.A.

(57) ABSTRACT

The disclosure herein describes an aircraft assembly tracker system including a user interface configured to display an aircraft part under assembly and overlay one or more zones on the displayed part. The user interface operates on a computing device. The zones represent different panels to be affixed to the aircraft during assembly and their shape displayed on the user interface is identical to the shape of their corresponding panel being affixed to the physical aircraft part. The aircraft assembly tracker system monitors the assembly progress of each zone and automatically alerts aircraft assembly workers when the zone is ready for closure.

21 Claims, 7 Drawing Sheets

AIRCRAFT ASSEMBLY TRACKER SYSTEMS AND METHODS

TECHNICAL FIELD

The present disclosure relates generally to aircraft assembly, and more particularly to systems and methods for tracking the assembly progress of aircraft and automatically alerting quality control operators when a particular part of an aircraft is ready to be affixed to the aircraft.

BACKGROUND

During the assembly of an aircraft in a factory, parts of the aircraft are assembled in an assembly line. Then, one or more external panels are affixed to the aircraft parts with screws or other fasteners in such a way that subparts behind these panels become inaccessible. A panel can, for example, be a flat or curved component, typically rectangular, that forms or is set into the body of the aircraft part. Similarly, one or more floor panels are affixed with screws or other fasteners inside the fuselage and subparts under these floor panels are then inaccessible. The phrase used hereinafter to refer to a panel being affixed to the aircraft with screws or other fasteners is to "close a zone". A "zone" is the area behind the panel. When all of the work inside a zone is complete and a panel has been affixed to the zone to close it, the quality control closure state of the zone is said to be closed. Otherwise, if the panel is not affixed to the zone, the quality control closure state of the zone is said to be open.

When a zone is being closed, a quality control operator checks that the panel is properly affixed, and then indicates the same by physically placing a stamp on one of the screws used to affix the panel. The quality control operator also reports this closure on a paper sheet of a set of paper sheets. If someone needs to re-open the zone by removing the panel, he needs to remove the screws, which destroys the marking and it becomes visible that the panel has been removed. Additionally, the person has to make sure that the paper sheet is updated properly. Hereinafter, a "quality control operator", a "user", or a "worker" may be used interchangeably to mean an entity (human, machine, computer, etc.) assembling an aircraft, operating a user interface, or otherwise performing work described hereinbelow.

When a worker or quality control operator wanted to view the status of the aircraft, i.e. which zones are closed or which zones are open, he or she would have to look at the set of paper sheets on which the quality control operators have reported the markings. The current process of aircraft assembly tracking is very cumbersome and time consuming, adding hours onto the assembly time. Furthermore, this process does not allow quality control operators or other workers in the assembly plant to view a comprehensive assembly progress of the aircraft.

SUMMARY

A purpose of the subject matter described herein is to disclose methods and systems for an aircraft assembly tracker that not only monitors and displays the assembly progress of aircraft being assembled, but also assists quality control operators in automatically alerting them to zones which are ready for closure.

The present disclosure significantly improves upon the cumbersome and time consuming nature of the current process used in aircraft assembly tracking described above. One way it does this is by displaying, on a user interface operated by a processor, a visualization of the aircraft assembly progress for each zone. A quality control operator can select an appropriate aircraft and an aircraft part of the selected aircraft on the user interface. When they select the part, a multi-dimensional graphical representation of the part is displayed on the user interface. Additionally, the zones are overlaid on the graphical representation of the part with a shape that is identical to the physical panel on the aircraft part. On the user interface, the zones are shaded different colors, patterns, or given other indicia, depending on their quality control closure state.

For example, in some embodiments of the present disclosure, the zone displayed on the aircraft part on the user interface will be colored blue if the panel is affixed to the aircraft, i.e. closed, and the zone will be colored red if the panel is not affixed to the aircraft. In other embodiments of the present disclosure other colors may be used to indicate the quality control closure state of the zones.

By shading the different zones based off their quality control closure state, the present disclosure significantly improves the current process for aircraft assembly tracking by visually allowing the quality control operator to quickly determine the quality control closure state of any zone on any given part by simply noting the color of the zone. This improved feature gives the quality control operator a visual indication of how much of the aircraft part is complete and how much is left to do. In the current process, there was no way for a quality control operator to visualize such information. This allows the quality control operator to predict approximately when the aircraft part will be completed.

Additionally, by selecting a particular zone on the user interface, the user, or another assembly worker, may view an assembly progress report of the zone. The assembly progress report comprises tasks that need to be completed on the zone before it can be closed, a closure history of the zone including how often and when it was closed or re-opened, and other information relating to the zone such as the facility from which the physical part the zone represents was delivered. In the current process, quality control operators and assembly workers would have to inspect the physical zone on the aircraft to determine if it was ready for closure. The assembly progress history feature of the present disclosure eliminates the cumbersome nature of the current process. Additionally, the feature of the present disclosure allows the quality control operator to display all of this information in one convenient location, whereas before this information was not readily available, much less in one location.

Another improvement on the current process for aircraft assembly tracking includes a feature of the present disclosure which automatically alerts quality control operators and other assembly workers that a particular zone may be closed because all of the tasks have been completed in that particular zone.

In this embodiment of the present disclosure, once all of the tasks of a particular zone have been completed, and either an automatic alert has been sent to the user interface or the user has verified, on the user interface, that the assembly progress history has no more tasks to complete, the user may close the zone by pressing a button on the user interface that applies a virtual stamp on the zone. When a virtual stamp is applied to a zone, it indicates that the zone is closed, and by applying the virtual stamp the color, shading, or other indicia of the zone on the user interface is changed to the corresponding "closed zone" color, shading, or other indicia. This feature of the present disclosure is advantageous over the current process because it eliminates the use of paper stamps (used to mark on a paper sheet that a zone is closed in the current process).

In some embodiments of the present disclosure, an aircraft assembly tracker system comprises: one or more computing devices comprising at least one processor and memory storing executable instructions for the at least one processor; and an aircraft assembly tracker implemented on the at least one processor and memory and configured to: display, on a user interface, a diagram of at least one selected part of an aircraft under assembly, wherein displaying the diagram comprises displaying a plurality of zones overlaid on a graphical representation of the at least one selected part, and displaying for one or more of the plurality of zones, a graphical indicator that indicates a quality control closure state of the zone; receive user input selecting a first zone of the plurality of zones; in response to receiving the user input, access an assembly history database for the aircraft to retrieve an assembly progress report for the first zone, wherein the assembly progress report for the first zone comprises a plurality of action items; display, on the user interface, at least a first portion of the assembly progress report, the first portion comprising completed action items; receive further user input selecting at least a second portion of the assembly progress report, the second portion comprising one or more non-completed action items, for completion; and in response to receiving the further user input, access the assembly history database for the aircraft, and update the assembly progress report for the first zone to indicate that at least the second portion of the action items on the assembly progress report have been completed.

In some embodiments of the present disclosure, the assembly history database comprises: a list of one or more aircraft; a list of one or more aircraft parts for each of the one or more aircraft; a list of a plurality of zones associated with each aircraft part; and an assembly progress report for each of the zones; wherein the user interface comprises a first user interface element for selecting an aircraft from the list of one or more aircraft, a second user interface element for selecting a part for the selected aircraft, and a third user interface element for selecting a zone for the selected aircraft part.

In some embodiments of the present disclosure, the user interface comprises a series of tabs at the bottom of the main page. Those tabs, when selected, display different pages such as a key performance indicator (KPI) page on the user interface. The KPI page will allow the user to visualize, in graphical form, the assembly history of the selected aircraft part. Additionally, it will allow the user to predict an approximate completion time of assembly for the selected aircraft. This is a significant enhancement over the current process because under the current process, it is difficult to predict when an aircraft under assembly would be finished. With this new and improved KPI feature, the quality control operators can view a real-time prediction for when the aircraft part under assembly would be completed as work is completed on particular zones.

In other embodiments of the present disclosure, the system further comprises: a list of one or more virtual quality control stamps; wherein a shape of each zone displayed on the user interface corresponds to a shape of the zone on the physical aircraft part; wherein the user interface comprises a fourth user interface element for attaching a virtual quality control stamp to the zone and a fifth user interface element for removing the virtual quality control stamp from the zone; wherein displaying the graphical indicator comprises indicia representing the quality control closure state of the plurality of zones and whether the virtual quality control stamp has been attached to the plurality of zones; and wherein the user interface is further configured for: receiving an additional user input on the fourth user interface element to attach the virtual quality control stamp, or on the fifth user interface element to remove the virtual quality control stamp to a selected zone; receiving an additional user input on a sixth user interface element to display key performance indicators such as a graph or chart showing a history of a number of zones completed on the aircraft part as well as a prediction of a date on which the aircraft part will be done with assembly; changing the graphical indicator of the zone in response to determining that the user has selected the fourth user interface element, wherein the graphical indicator is updated to indicate that the quality control closure state of the zone is now closed; changing the graphical indicator of the selected zone in response to determining that the user has selected the fifth user interface element, wherein the graphical indicator is updated to indicate that the quality control closure state of the selected zone is now open; and updating the assembly history database with a change corresponding to the selected zone and its present quality control closure state.

In other embodiments of the present disclosure, the assembly tracker is further configured to automatically determine whether the quality control closure state of the selected zone can be changed to closed and triggering a process for closing the zone by a quality control operator.

In other embodiments of the present disclosure, the aircraft assembly tracker is configured to continuously monitor the assembly progress report of every zone stored in the assembly history database; wherein the aircraft assembly tracker is configured to trigger, upon determining that every action item on the assembly progress report has been completed for one or more zones, the process for closing the one or more zones by the quality control operator; and wherein, the user interface is configured to display the one or more zones and their corresponding assembly progress report to the quality control operator, and receive a selection from the quality control operator, using the fourth user interface element, to apply a virtual quality control stamp to the first zone.

BRIEF DESCRIPTION OF THE DRAWINGS

The features of the disclosure herein mentioned above, as well as others, will appear more clearly to those skilled in the art after reading the following descriptions of example embodiments. The detailed description that follows this section references the example figures briefly described below.

DETAILED DESCRIPTION

Figure 1A:
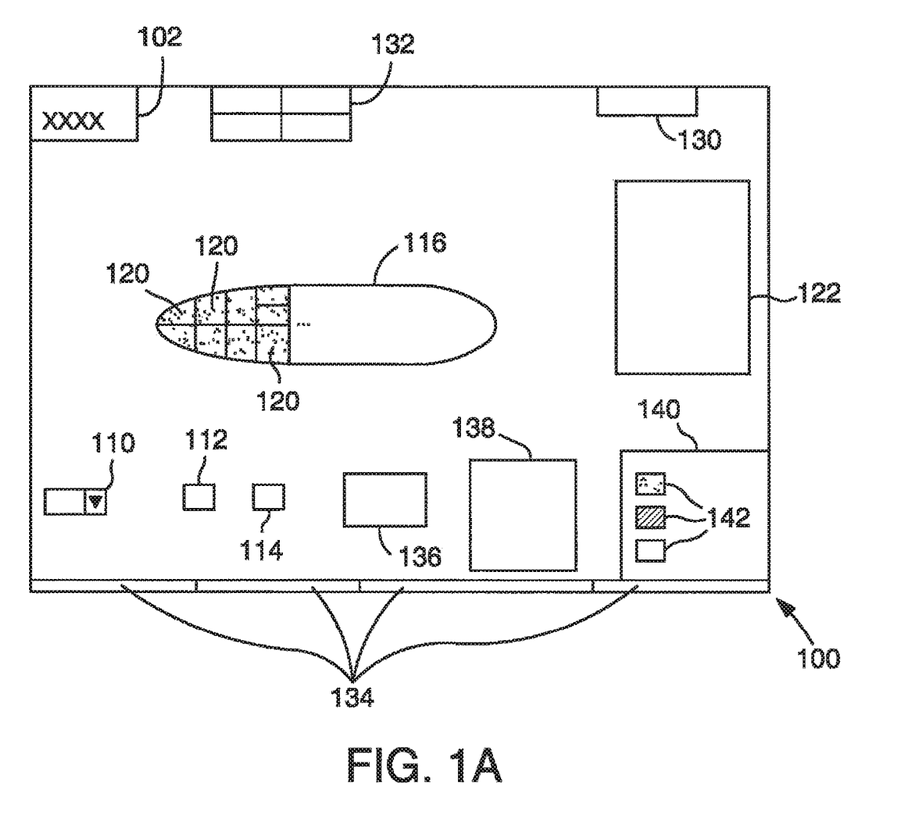
FIG. 1A is a visualization or representation of an example main page of an example user interface that quality control operators and other workers will use to view the assembly progress of a selected aircraft part.

FIG. 1A is a visualization or representation of the main page 100 of an example user interface that users will operate to view and manipulate the assembly progress of a selected aircraft part. The user interface is generated and operated by one or more processors that run on a computing device. In some embodiments of the present disclosure, the user interface operates on a mobile device, for example, a wireless tablet. In other embodiments of the present disclosure, the user interface operates on desktop computer. In some embodiments of the present disclosure, the user interface comprises a touch screen, wherein a user may touch the elements of the user interface on the physical screen of the underlying device operating the user interface. The user may touch the screen with her or his finger, a stylus, or any other suitable instrument for the device operating the user interface. In further embodiments of the present disclosure, the user may select elements on the user interface using a computer mouse or other media suitable for the device operating the user interface. The described user interaction above is equivalent to the user selecting an element on the user interface.

In some embodiments of the present disclosure, the main page 100 of the user interface comprises an aircraft selection element 102, which allows the user to select the aircraft the user wants to view or manipulate by entering the aircraft serial number into the aircraft selection element 102 or selecting from a dropdown menu of aircraft serial numbers of aircraft currently being assembled.

In some embodiments of the present disclosure, the main page 100 of the user interface further comprises an aircraft part dropdown menu 110. The aircraft part dropdown menu 110 comprises a list of all of the aircraft parts that a selected aircraft is comprised of. Once the user has selected an aircraft, they may select a part from the aircraft part dropdown menu 110, and the main page 100 of the user interface will display a graphical representation of the selected aircraft part 116. In some embodiments of the present disclosure, the graphical representation of the selected aircraft part 116 will be a two-dimensional image. In other embodiments of the present disclosure, the graphical representation of the selected aircraft part 116 will be a multi-dimensional image. In FIG. 1A, the selected aircraft part 116 is displayed as a two-dimensional graphic.

In some embodiments of the present disclosure, multiple zones 120 will be overlaid on the selected aircraft part 116. Each zone 120 will have the same shape on the main page 100 of the user interface as the physical panel which gets fastened on the physical aircraft during assembly. Not only will the zone 120 on the main page 100 of the user interface have the same shape as the physical panel, it will also have the same size on the selected aircraft part 116 in proportion to the physical aircraft part being assembled. For example, if the main page 100 of the user interface displays the selected aircraft part 116 as a 100:1 size ratio in relation to the physical aircraft part being assembled, the size ratio of a zone 120 overlaid on the displayed aircraft part 116 will also have a 100:1 size ratio in relation to the physical zone which gets fastened on the physical aircraft during assembly. Additionally, every zone 120 may be separate and apart from every other zone 120, however, one zone 120 may be displayed within another zone 120.

In some embodiments of the present disclosure, the zones 120 are shaded, marked, or colored with different indicia 142 depending on their quality control closure state. The main page 100 of the user interface comprises a glossary 140 which defines for the user what quality control closure state each indicia 142 represents. The indicia 142 can be represented by several colors or patterns in each indicia box 142 and beside each indicia 142 box, the glossary 140 will display a written description of what the indicia 142 indicates about the quality control closure state of a zone 120.

In some embodiments of the present disclosure a selected zone 120 by the user will appear yellow, orange, white or any other color, shade, or pattern to distinguish the zone 120 as the one being selected on the user interface. In some embodiments of the present disclosure, a zone 120 which has a closed quality control closure state will appear blue. In some embodiments of the present disclosure, a zone 120 which has an open quality control closure state will appear red. Those of ordinary skill in the art will appreciate that other colors may be used to depict when a zone 120 is selected, closed, or open. Additionally, those of ordinary skill in the art will appreciate that patterns may be used to depict when a zone 120 is selected, closed, or open. For example, in FIGS. 1A-1D, a zone 120 with a closed quality control closure state has a hatched pattern, a zone 120 with an open quality control closure state has a stippled pattern, and a zone 120 which has been selected by the user has no pattern at all.

Some embodiments of the present disclosure may depict the quality control closure state of one or more zones 120 using horizontal, vertical, or diagonal lines. Further embodiments of the present disclosure may depict the quality control closure state of the one or more zones 120 using checkered patterns or other viable patterns to distinguish the quality control closure state of the zones.

Those of ordinary skill in the art will appreciate that coloration and patterns are not the sole way to distinguish the quality control closure state of each zone 120. Therefore, the hereinabove disclosed methods of distinguishing the quality control closure state of each zone 120 is not to be construed as limiting the method of displaying the quality control closure state of each zone 120 to only those methods.

In some embodiments of the present disclosure, each zone 120 may be selected by the user with her or his finger, a stylus, or other suitable method described hereinabove. When the user has selected a zone 120, the user interface gives them several different options on the main page 100 to take. A first option they may take is to view the details 136 of the selected zone 120. The details 136 of the selected zone 120 could comprise a name or label, the quality control closure state, or other relevant information of the selected zone 120.

Alternatively, another option the user may take is to review the assembly progress 122 for the zone 120. The assembly progress 122 comprises a list of action items, both remaining and completed on the zone 120, as well as an assembly history of the zone 120. The user can choose to simply view the assembly progress 122 or select one or more of the action items for completion.

Once the entire list of action items on the assembly progress 122 for a selected zone 120 has been completed, including the zone 120 being properly affixed with screws to the aircraft, an automatic alert is sent by the user interface to the user indicating that the zone 120 is ready for closure.

The alert is either displayed to the user on the main page 100 of the user interface, or sent to the user by some other means such as electronic mail, text message, or some other mode of communication. The user may choose to act on that alert or ignore it for the time being. If the user chooses to act on the alert, the user will select the zone 120 that the alert was sent for (if not already selected) and then select the install virtual stamp element 112. When the install virtual stamp element 112 is selected, the zone 120 is marked as closed by shading the zone 120 on the display of the selected aircraft part 116 the appropriate color as identified in the glossary 140.

Alternatively, after selecting the zone 120, the user may enter a comment for the zone 120 in the comment box 138. The comment box 138 is an element of the main page 100 of the user interface which is selectable by the user, and upon its selection, a means for entering the comments is displayed on the main page 100 of the user interface, and the user may enter his or her comments.

In yet another alternative embodiment, the user may select a zone 120 that is already closed, and remove the virtual quality control stamp from the zone 120 by selecting the remove virtual stamp element 114. After the remove virtual stamp element 114 is selected, the selected zone 120 is shaded the appropriate color indicating that its quality control closure state is open again.

In some embodiments of the present disclosure, the main page 100 of the user interface comprises a latest update element 130, which displays to the user the date and time of the latest update of the selected aircraft part 116. When the user makes a change to any of the zones 120 of the selected aircraft part, the latest update element 130 is updated with the present date and time.

In some embodiments of the present disclosure, the main page 100 of the user interface comprises a status indicator element 132 which indicates the overall assembly progress of the selected part 116. For example, in some embodiments of the present disclosure, if there are fifty zones 120 associated with a particular aircraft part 116 and thirty of the zones 120 have a closed quality control closure state, then the status indicator element 132 will display the number "50", indicating that there are fifty total zones 120 associated with the selected aircraft part 116, and display the number "30", indicating that thirty zones 120 have a closed quality control closure state and that twenty zones 120 remain in an open quality control closure state.

In some embodiments of the present disclosure, the main page 100 of the user interface comprises a set of tabs 134 at the bottom of the screen. These tabs 134 will include other pages besides the main page 100. When the user selects one of the tabs 134, a new page will appear, displaying, for example, key performance indicators as will be discussed below in FIG. 3. Those of ordinary skill in the art will appreciate that the tabs 134 may link to other pages besides key performance indicators. Those of ordinary skill in the art will also appreciate that one of the tabs 134, when selected, will display the main page 100 again to the user.

Figure 1B:
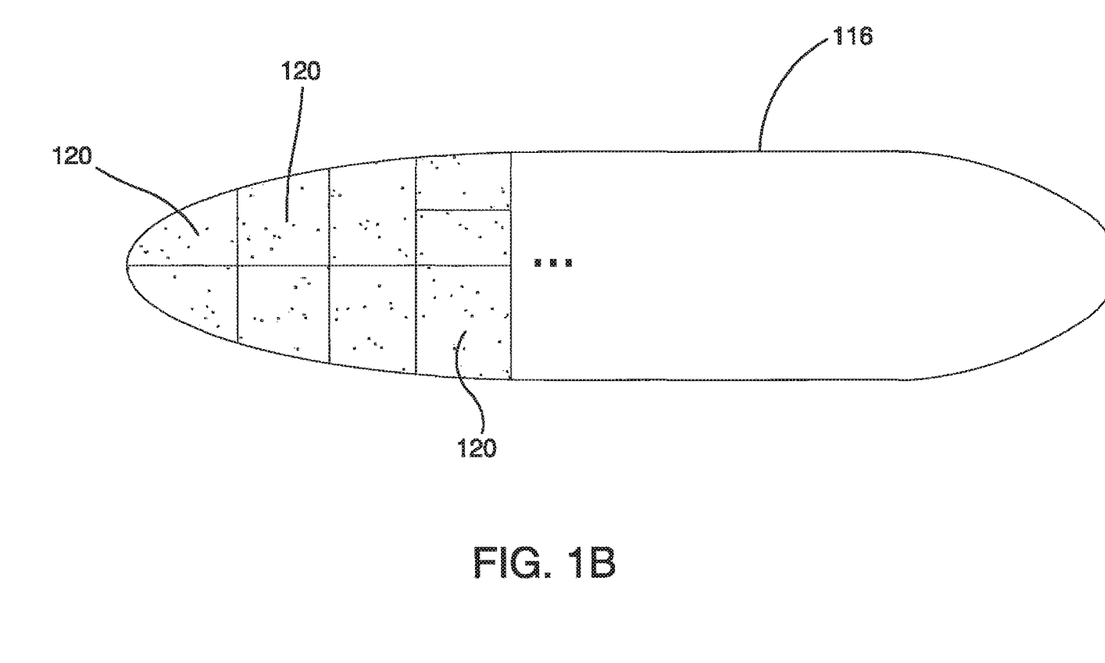
FIG. 1B is a schematic illustration showing a physical aircraft part being assembled with no panels affixed to it, and all zones opened.

FIG. 1B is a schematic illustration showing the aircraft part 116 from the user interface physically being assembled. FIG. 1A shows the aircraft part 116 virtually on the user interface. FIG. 1B is an illustration of the physical aircraft part 116 in reality being assembled. In FIG. 1B, the aircraft part 116 is illustrated with no panels 124 (see FIG. 1D) affixed to it, and all zones 120 open.

Figure 1C:
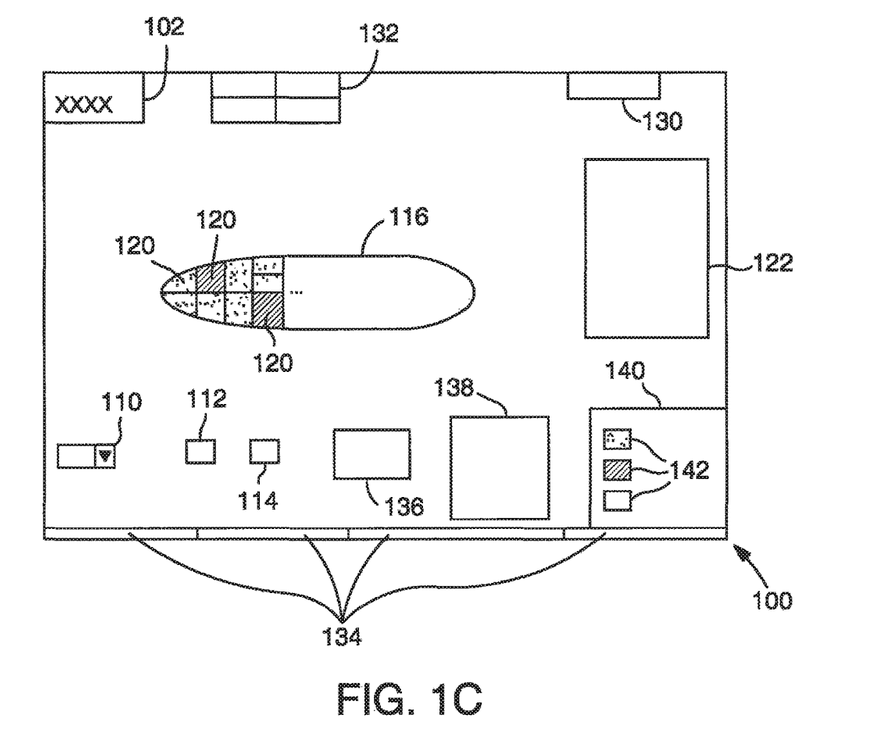
FIG. 1C is a visualization or representation of the main page of an example user interface with one or more zones closed.

FIG. 1C is a visualization or representation of the main page 100 of an example user interface with one or more zones 120 closed. Several of the zones 120 are given an indicia 142 indicating that the panel 124 (see FIG. 1D) has been affixed to the aircraft part 116 and the zone 120 has been closed. As an example embodiment of the present disclosure, in FIG. 1C, the zones 120 which have hatched patterns are closed, and the zones 120 which have stippled patterns are open.

Figure 1D:
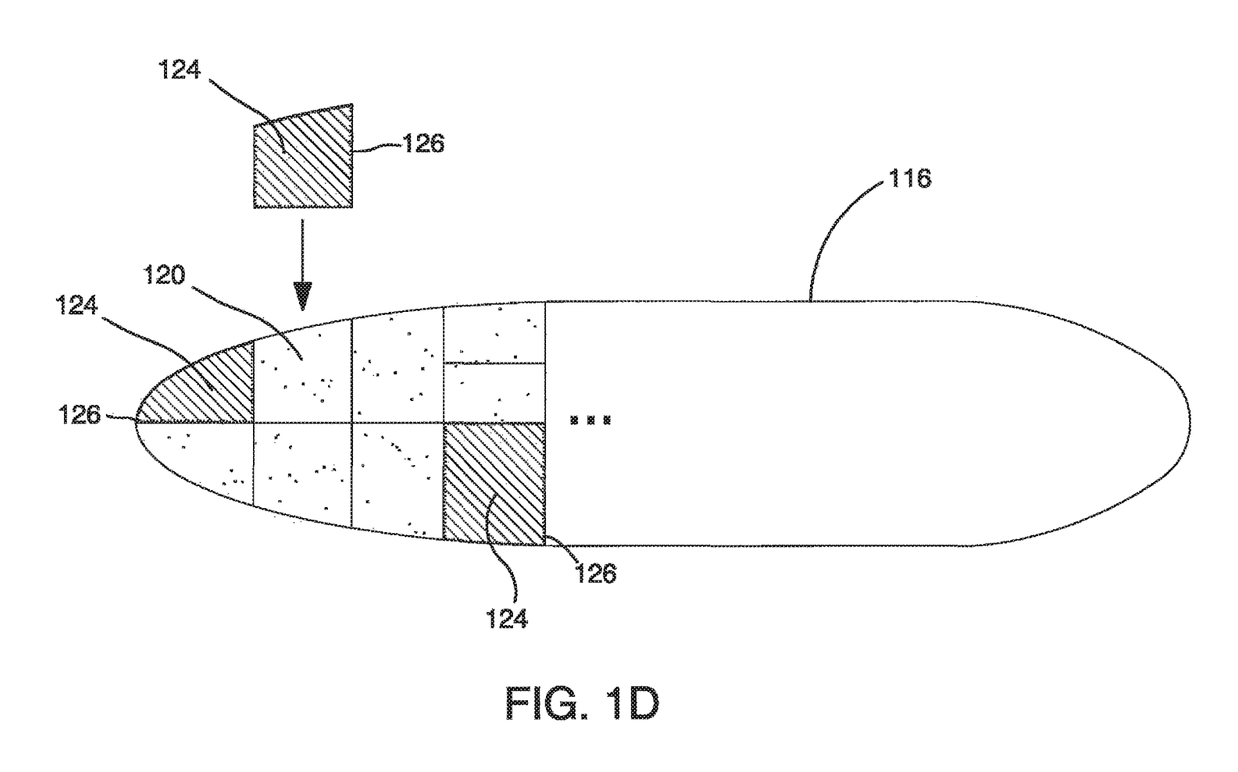
FIG. 1D is a schematic illustration showing a physical aircraft part with several panels affixed to the physical aircraft part with fasteners and another panel which has not yet been affixed.

FIG. 1D is a schematic illustration showing a physical aircraft part 116 with several panels 124 affixed to the physical aircraft part with fasteners and another panel 124 which has not been affixed. On the physical aircraft part 116, several of the zones 120 are opened as indicated by their stippled pattern, 2 of the zones 120 are closed as indicated by the panel 124 with hatched pattern affixed to the closed zones 120, and 1 of the zones 120 is opened, as indicated by its stippled pattern, but has a panel 124 above it. This part of FIG. 1D illustrates, for example, what closing the zone 120 means. Closing the zone 120 on the physical aircraft part 116 comprises placing the panel 124 on the physical aircraft part 116 and fastening the panel 124 with a fastener. In some embodiments of the present disclosure the fasteners may be screws, bolts, welding, or any other suitable fastener which could sufficiently affix the panel 124 to the aircraft part 116, closing the zone 120.

Figure 2:
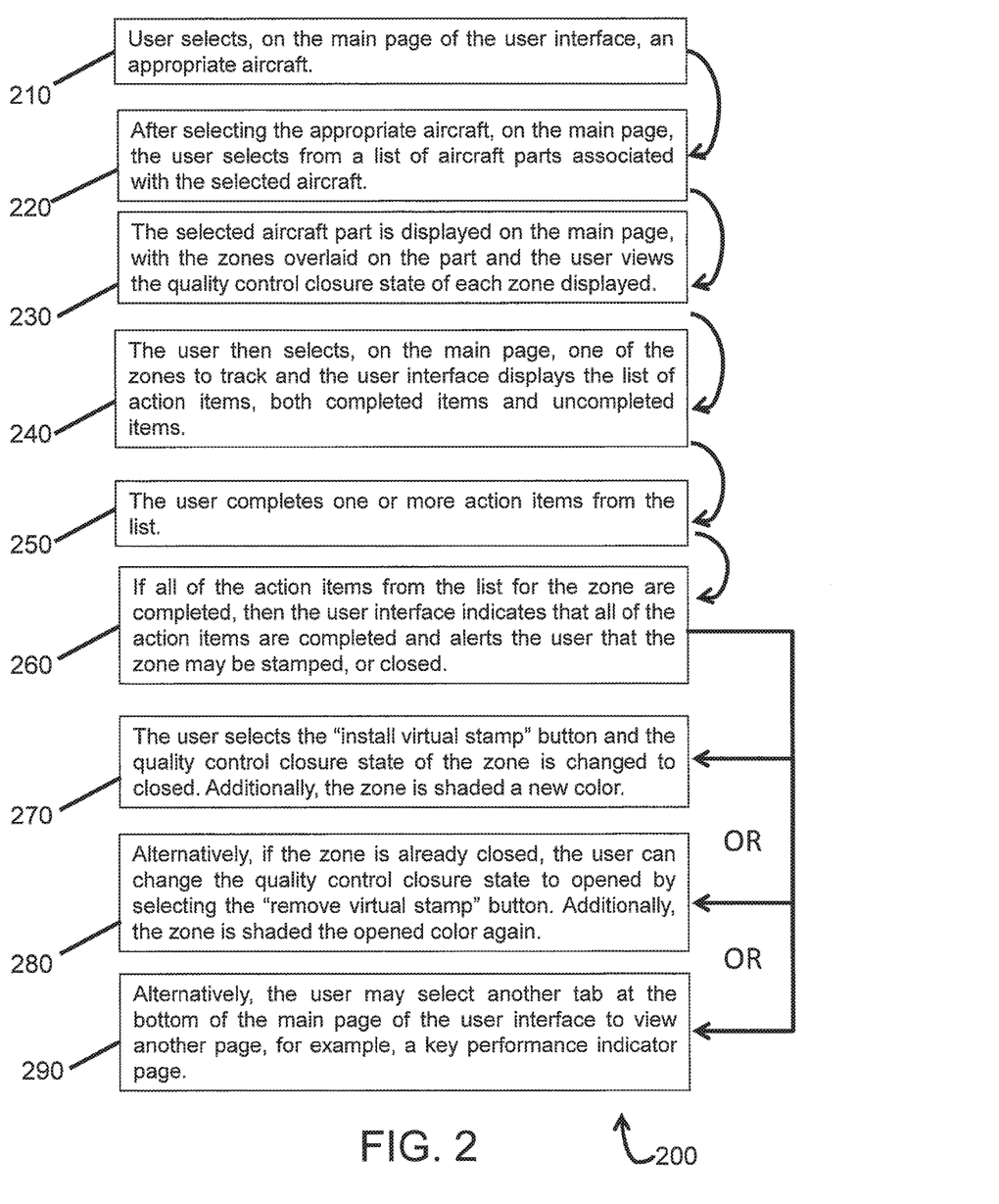
FIG. 2 is a flow chart depicting an example process by which a quality control operator could use or implement the user interface.

FIG. 2 is a flow chart 200 depicting an example process by which a quality control operator could use or implement the user interface. After the user begins the program running the user interface, they follow the first step in the process 210 by selecting, on the main page 100 (see FIG. 1A) of the user interface, an appropriate aircraft. In the second step 220, after selecting the appropriate aircraft, on the main page 100 (see FIG. 1A), the user selects from a list of aircraft parts associated with the selected aircraft. In the third step 230, the selected aircraft part is displayed on the main page 100 (see FIG. 1A), with the zones 120 (see FIG. 1A) overlaid on the part, and the user views the quality control closure state of each zone 120 (see FIG. 1A) displayed. In the fourth step 240, the user then selects, on the main page 100 (see FIG. 1A), one of the zones 120 (see FIG. 1A) to track and the user interface displays the list of action items, both completed items and uncompleted items.

In the fifth step 250, the user completes one or more action items from the list. In the sixth step 260, if all of the action items from the list for the zone 120 (see FIG. 1A) are completed, then the user interface will indicate that all of the action items are completed and will send an alert to the user that the zone 120 (see FIG. 1A) may be stamped, or closed. After completing the sixth step 260, the user may proceed to either the seventh step 270, eighth step 280, or ninth step 290. In the seventh step 270, the user selects the "install virtual stamp button" and the quality control closure state of the zone 120 (see FIG. 1A) will be changed to closed. Additionally, the zone 120 (see FIG. 1A) will be shaded a new color indicating it has been closed, and the indicia of the zone 120 (see FIG. 1A) will be changed to show that it is closed as well. In the eighth step 280, if the zone 120 (see FIG. 1A) is already closed, the user can change the quality control closure state of the zone 120 (see FIG. 1A) to opened by selecting the "remove virtual stamp" button. The indicia of the zone 120 (see FIG. 1A) will be changed to show that it is closed as well. In the ninth step 290, the user may select another tab 134 (see FIG. 1A) at the bottom of the main page 100 (see FIG. 1A) of the user interface to view another page, for example, a KPI page.

Figure 3:
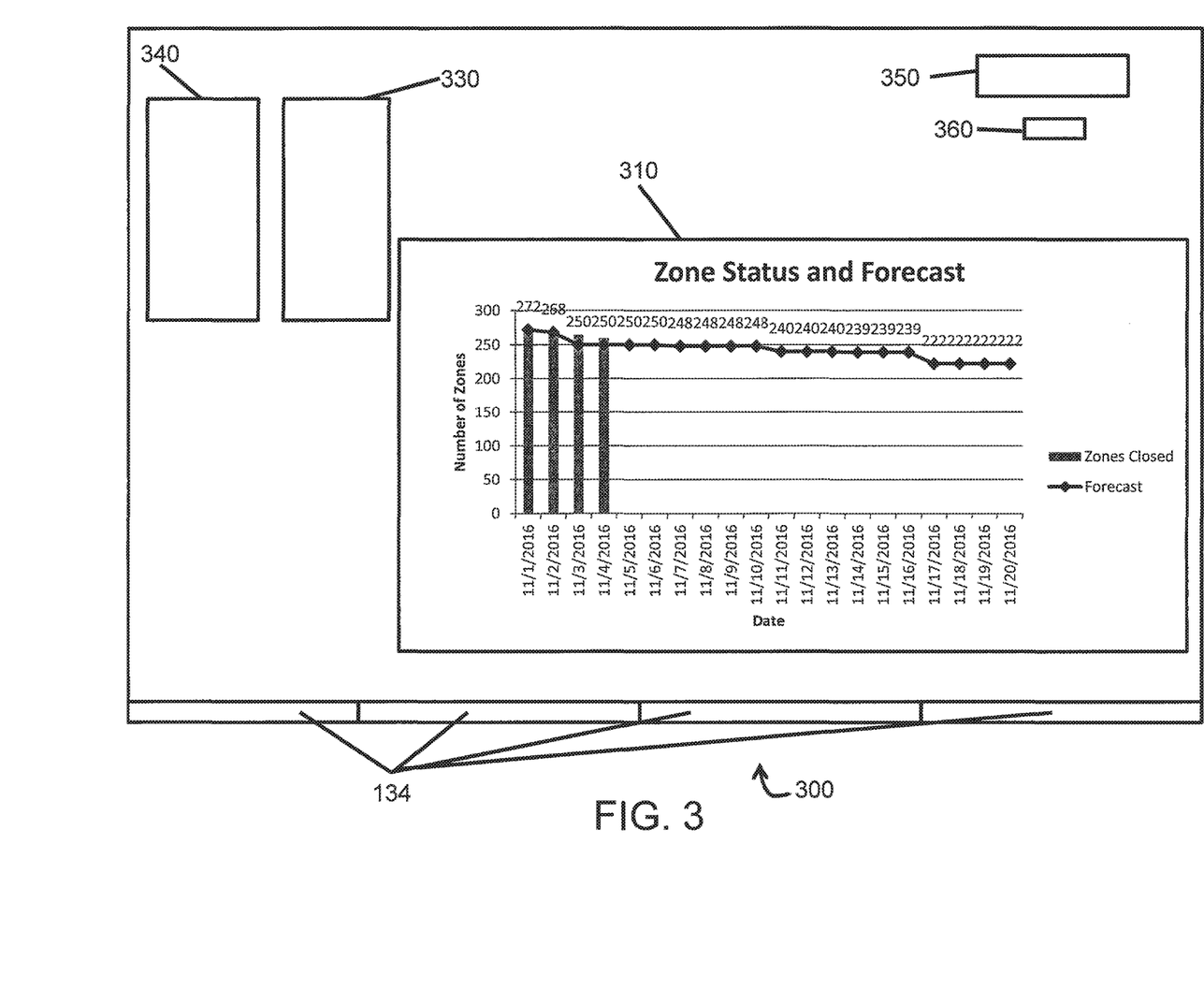
FIG. 3 is a visualization or representation of an example user interface when the KPI tab is selected by the user.

FIG. 3 is a visualization of an example user interface when the KPI tab is selected by the user. Starting on the main page 100 (see FIG. 1A) the user selects one of the tabs 134 that is designated as a KPI page 300. The KPI page 300 is displayed as a new page on the user interface and it retains the same tabs 134 at the bottom as the main page 100 (see FIG. 1A) on the user interface. This functionality allows the user to move between the different pages including the KPI page 300 and the main page 100 (see FIG. 1A) by selecting one of the tabs 134.

Displayed on the KPI page 300, is a graph 310 detailing a history of the number of zones 120 (see FIG. 1A) closed on any given date as well as a forecast of how many zones 120 (see FIG. 1A) will be closed on any future date. In this regard, the graph 310 will help the user determine on approximately what date the particular aircraft part 166 (see FIG. 1A) will be completed during assembly. Those of ordinary skill in the art will appreciate that the graph 310 can be manipulated and altered in many different ways. For example, in some embodiments, the graph 310 could display the number of zones 120 (see FIG. 1A) left to close on a particular aircraft part 116 (see FIG. 1A). In other embodiments, the graph 310 could display the number of zones 120 (see FIG. 1A) completed on a particular day and then forecast the number of zones 120 (see FIG. 1A) projected to be closed on any subsequent day.

The zone list 330 displays a list of the zones associated with the particular aircraft part the user selected on the main page. The zone list 330 will indicate which zones have been closed and which zones are still open. In some embodiments of the present disclosure, the zone list 330 will indicate that the zones 120 (see FIG. 1A) have been closed by giving the text of the zone 120 (see FIG. 1A) name in the zone list 330 a different color than the open zones in the zone list 330. Those of ordinary skill in the art will appreciate that the zone list 330 may use other methods of indicated closed zones 120 (see FIG. 1A) as well. For example, the zone list 330 could indicate closed zones 120 (see FIG. 1A) by putting a "*" or other character at the end of the name in the zone list 330.

The graph manipulator 340 allows the user to select certain parameters to alter the graph 310. These parameters can include date ranges, single dates, week ranges, or other suitable parameters depending on what kind of KPI information the user needs to display.

The latest update indicator 350 displays to the user the date and time that the KPI page 300 or zone 120 (see FIG. 1A) information was last updated. The latest update indicator 350 is automatically updated by the user interface when a zone 120 (see FIG. 1A) is altered by either closing it or opening it. The latest update indicator 350 is manually updated by the user interface when the user selects the manual update button 360. The user can select the manual update button 350 at any time. However, in some embodiments of the present disclosure, the user will select the manual update button 350 after altering the graph 310 or some other aspect of the KPI page 300. Any updates are saved by the user interface.

Figure 4:
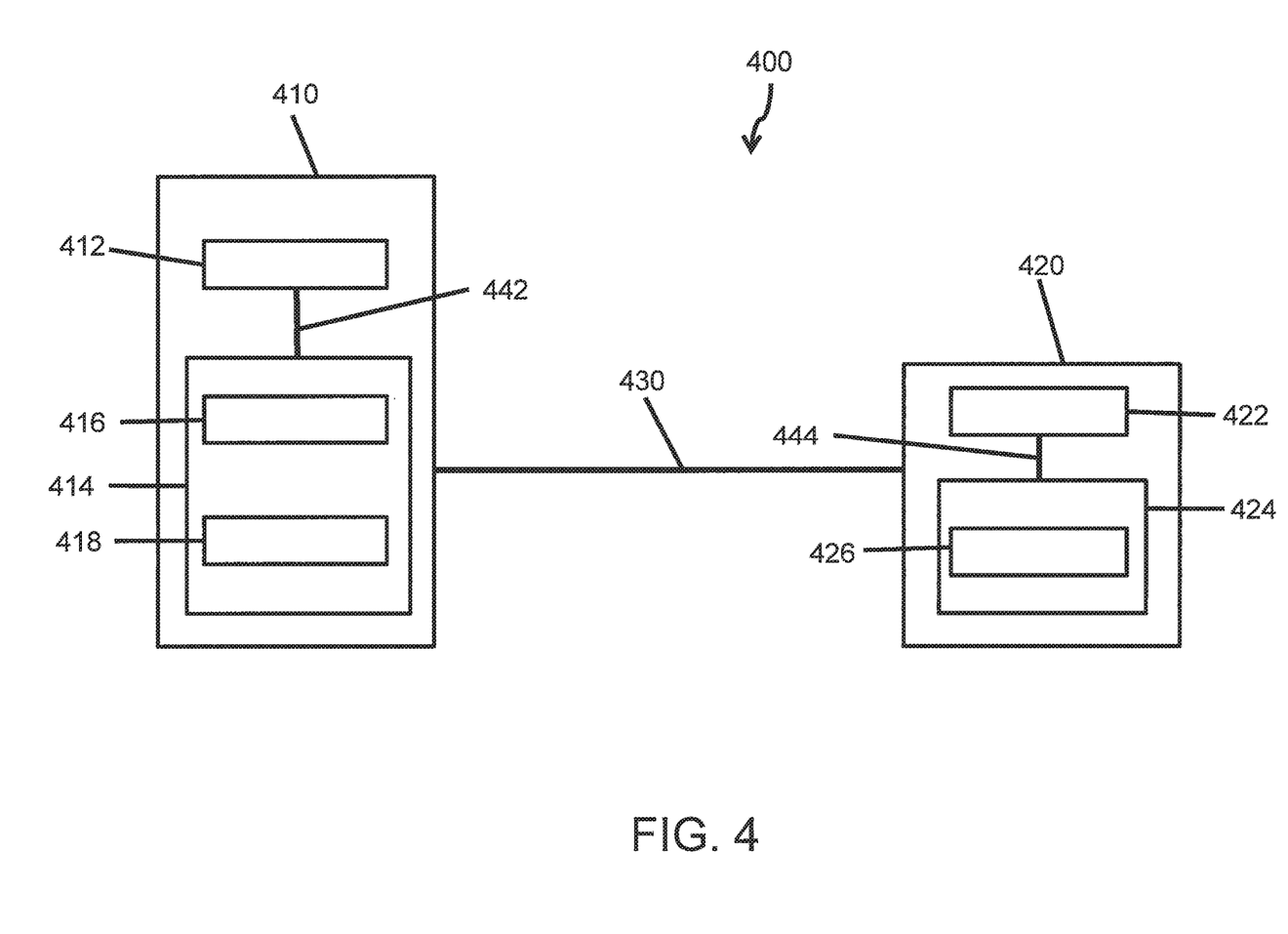
FIG. 4 is a block diagram depicting an example aircraft assembly tracker system including the device operating the user interface and its communication with a centralized aircraft assembly server.

FIG. 4 is a block diagram depicting an example aircraft assembly tracker system 400 comprising at least the device 420 operating the user interface and its communication link 430 with a centralized aircraft assembly server 410. The centralized aircraft assembly server 410 comprises a processor 412 and a memory 414, the memory comprising an aircraft assembly list 416 and a virtual stamp list 418. The processor 412 is electronically connected to the memory 414 via a circuit 442 that allows the processor 412 to communicate with the memory 414 to retrieve instructions to operate the server 410 and perform other functions described hereinbelow. The memory 414, in addition to the instructions used to run the server 410 itself, comprises the aircraft assembly list 416 including all of the aircraft, aircraft parts, and zone 120 (see FIG. 1A) assembly progress reports for all of the aircraft that need to be tracked by the aircraft assembly tracker system 400. Additionally, the memory 414 comprises the virtual stamp list 418 to keep track of the virtual stamps which have been applied and which ones have not been applied.

The user interface is operated by a device 420 capable of operating a user interface. In some embodiments of the present disclosure, the device 420 operating the user interface could be a mobile tablet. In other embodiments of the present disclosure, the device 420 operating the user interface could be a mobile phone, a desktop computer, a laptop, or other suitable computing device that can operate a user interface.

The device 420 operating the user interface comprises a processor 422 and a memory 424, the memory 424 comprising the user interface software 426 to display and operate the user interface. The processor 422 is electronically connected to the memory 424 via a circuit 444 that allows the processor 422 to fetch instructions to operate the device 420 and the user interface software 426.

Communication link 430 is either a wired communication link or wireless communication link between the device 420 running the user interface software 426 and the aircraft assembly server 410. This communication link 430 establishes a computer network between the aircraft assembly server 410 and the device 420 running the user interface software 426. In some embodiments of the present disclosure the communication link 430 can use traditional Ethernet protocols to pass information between the device 420 running the user interface software 426 and the aircraft assembly server 410. In other embodiments of the present disclosure, the communication link 430 can use other suitable protocols to pass information between the device 420 running the user interface software 426 and the aircraft assembly server 410. The paragraphs below discuss what information is passed between the server 410 and the device 420 operating the user interface software 426 using the communication link 430.

In one embodiment of the present disclosure, both the aircraft assembly server 410 and the device 420 running the user interface software 426 are powered off. In this embodiment, the device 420 is a mobile tablet and the user interface software 426 has already been installed into the memory 424 of the device 420. The user powers on the device 420 and the processor 422 fetches instructions via circuit 444 from the memory 424 to operate the device 420 and operate the user interface software 426. Once the instructions are fetched and executed by the processor 422, the user operates the device 420. In this particular embodiment, the device 420 has a touch screen that allows the user to operate the user interface software 426 by touching the screen of the device 420 using his or her finger, a stylus, or other suitable instrument (not shown).

When the user touches the screen of the device 420 to operate the user interface software 426, the device displays the main page 100 (see FIG. 1A) of the user interface to the user on the screen of the device 420. Using her or his finger, or other suitable instrument described hereinabove, the user then selects an aircraft serial number on the aircraft selection element 102 (see FIG. 1A). At that moment, the device 420 will communicate with the aircraft assembly server 410, via communication link 430, to retrieve the list of aircraft parts for the selected aircraft in the aircraft assembly list 416 of the aircraft assembly server 410. The user interface software 426 will then display the list of aircraft parts on the main page 100 of the user interface via the aircraft part dropdown menu 110 (see FIG. 1A). Using his or her finger or other suitable instrument, the user then selects an aircraft part from the aircraft part dropdown menu 110 (see FIG. 1A) on the main page 100 of the user interface. At that moment, the user interface software 426 will display on the main page 100 of the user interface the aircraft part 116 (see FIG. 1A) along with the zones 120 (see FIG. 1A) associated with that aircraft part 116 (see FIG. 1A).

After the user has received an alert that a zone 120 (see FIG. 1A) is ready for closure, or after a user has manually verified that a zone 120 (see FIG. 1A) is ready for closure, the user will then select, the apply virtual stamp button 112 (see FIG. 1A) on the main page 100 of the user interface. Upon receiving this input on the screen of the device 420, the device 420 will communicate with the aircraft assembly server 410 via communication link 430 and instruct the processor 412 of the aircraft assembly server 410 to assign a virtual stamp from the virtual stamp list 418 to the appropriate zone 120 (see FIG. 1A) in the aircraft assembly list 416. The processor 412 of the aircraft assembly server 410 will then make the appropriate alterations in the aircraft assembly list 416 and the virtual stamp list 418 by giving appropriate instructions to the memory 414 via circuit 442.

Once the aircraft assembly list 416 has been updated, the server 410 communicates with the device 420 running the user interface software 426 via communication link 430 to update the display of the aircraft part 116 on the main page 100 of the user interface. This update comprises shading the zone 120 (see FIG. 1A) that was updated the proper color or pattern indicating the zone's 120 (see FIG. 1A) quality control closure state and updating the action item list 122 (see FIG. 1A) for the zone 120 (see FIG. 1A).

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

What is claimed is:

1. An aircraft assembly tracker system comprising:
    one or more computing devices comprising at least one processor and memory storing executable instructions for the at least one processor; and
    an aircraft assembly tracker implemented on the at least one processor and memory and configured to:
        display, on a user interface, a diagram of at least one selected part of an aircraft under assembly, wherein displaying the diagram comprises displaying a plurality of zones overlaid on a graphical representation of the at least one selected part, and displaying for one or more of the plurality of zones, a graphical indicator that indicates a quality control closure state of the zone;
        receive user input selecting a first zone of the plurality of zones;
        in response to receiving the user input, access an assembly history database for the aircraft to retrieve an assembly progress report for the first zone, wherein the assembly progress report for the first zone comprises a plurality of action items;
        display, on the user interface, at least a first portion of the assembly progress report, the first portion comprising completed action items;
        receive further user input selecting at least a second portion of the assembly progress report, the second portion comprising one or more non-completed action items, for completion; and
        in response to receiving the further user input, access the assembly history database for the aircraft, and update the assembly progress report for the first zone to indicate that at least the second portion of the action items on the assembly progress report have been completed.

2. The aircraft assembly tracker system of claim 1, wherein the assembly history database comprises:
    a list of one or more aircraft;
    a list of one or more aircraft parts for each of the one or more aircraft;
    a list of a plurality of zones associated with each aircraft part; and
    an assembly progress report for each of the zones;
    wherein the user interface comprises a first user interface element for selecting an aircraft from the list of one or more aircraft, a second user interface element for selecting a part for the selected aircraft, and a third user interface element for selecting a zone for the selected aircraft part.

3. The aircraft assembly tracker system of claim 1, wherein the system further comprises:
    a list of one or more virtual quality control stamps;
    wherein a shape of each zone displayed on the user interface corresponds to a shape of the zone on the physical aircraft part;
    wherein the user interface comprises a fourth user interface element for attaching a virtual quality control stamp to the zone and a fifth user interface element for removing the virtual quality control stamp from the zone;
    wherein displaying the graphical indicator comprises indicia representing the quality control closure state of the plurality of zones and whether the virtual quality control stamp has been attached to the plurality of zones; and wherein the user interface is further configured for:
receiving an additional user input on the fourth user interface element to attach the virtual quality control stamp, or on the fifth user interface element to remove the virtual quality control stamp to a selected zone;
receiving an additional user input on a sixth user interface element to display key performance indicators such as a graph or chart showing a history of a number of zones completed on the aircraft part as well as a prediction of a date on which the aircraft part will be done with assembly;
changing the graphical indicator of the zone in response to determining that the user has selected the fourth user interface element, wherein the graphical indicator is updated to indicate that the quality control closure state of the zone is now closed;
changing the graphical indicator of the selected zone in response to determining that the user has selected the fifth user interface element, wherein the graphical indicator is updated to indicate that the quality control closure state of the selected zone is now open; and
updating the assembly history database with a change corresponding to the selected zone and its present quality control closure state.

4. The aircraft assembly tracker system of claim 1 wherein the assembly tracker is further configured to automatically determine whether the quality control closure state of the selected zone can be changed to closed and trigger a process for closing the zone by a user.

5. The aircraft assembly tracker of claim 4, wherein the aircraft assembly tracker is configured to continuously monitor the assembly progress report of every zone stored in the assembly history database;
wherein the aircraft assembly tracker is configured to trigger, upon determining that every action item on the assembly progress report has been completed for one or more zones, the process for closing the first zone by the user; and
wherein the user interface is configured to display the one or more zones and their corresponding assembly progress report to the user, and receive a selection from the user, utilizing the fourth user interface element, to apply a virtual quality control stamp to the one or more zones.

6. The aircraft assembly tracker system of claim 1, wherein each zone corresponds to a portion of the aircraft part that, in assembly, will be closed by affixing a panel to the aircraft part; and
wherein the quality control closure state specifies that the action items for a zone are complete, that the panel has been physically secured to the aircraft part, and that a user has applied a virtual stamp to the zone.

7. The aircraft assembly tracker system of claim 1, wherein the tracker system further comprises:
a server comprising at least one processor and memory storing executable instructions for the at least one processor;
one or more communication elements implemented on the at least one processor, configured to communicate with the user interface operating on the computing device; and
one or more databases.

8. The aircraft assembly tracker system of claim 1, wherein the diagram of the at least one selected part of an aircraft under assembly is an up-to-date diagram of the at least one selected part, including any changes to the quality control closure state of any of the displayed zones that have been made since the selected part first began assembly.

9. The aircraft assembly tracker system of claim 1, wherein displaying the graphical indicator comprises displaying the graphical indicator on all of the plurality of zones.

10. A method for tracking aircraft assembly, the method comprising:
storing executable instructions for implementing a user interface in a memory for at least one processor;
implementing and then operating the user interface on the at least one processor;
displaying, on the user interface, a diagram of at least one selected part of an aircraft under assembly, wherein displaying the diagram comprises displaying a plurality of zones overlaid on a graphical representation of the at least one selected part, and displaying for one or more of the plurality of zones, a graphical indicator that indicates a quality control closure state of the zone;
receiving user input selecting a first zone of the plurality of zones;
in response to receiving the user input, accessing an assembly history database for the aircraft to retrieve an assembly progress report for the first zone, wherein the assembly progress report for the first zone comprises a plurality of action items;
displaying, on the user interface, at least a first portion of the assembly progress report, the first portion comprising completed action items;
receiving further user input selecting at least a second portion of the assembly progress report, the second portion comprising one or more non-completed action items, for completion; and
in response to receiving the further user input, accessing the assembly history database for the aircraft, and updating the assembly progress report for the first zone to indicate that at least the second portion of the action items on the assembly progress report have been completed.

11. The method of claim 10, wherein the shape of any individual zone displayed on the user interface corresponds to a shape of the individual zone on the physical aircraft part;
wherein the user interface displays a first user interface element for selecting an aircraft from the list, a second user interface element for selecting a part for the selected aircraft, and a third user interface element for selecting the first zone for the selected aircraft part;
wherein the user interface displays a fourth user interface element for attaching a virtual quality control stamp to the first zone and a fifth user interface element for removing a virtual quality control stamp from the first zone; and
wherein displaying the graphical indicator comprises shading the first zone to indicate the quality control closure state of the first zone and thus whether a virtual quality control stamp has been attached to the first zone.

12. The method of claim 11, wherein the method further comprises:
receiving an additional user input on the fourth user interface element to attach a virtual quality control stamp, or on the fifth user interface element to remove a virtual quality control stamp to a selected zone;
receiving an additional user input on a sixth user interface element to display key performance indicators such as a graph or chart showing a history of a number of zones completed on the aircraft part as well as a prediction of a date on which the aircraft part will be done with assembly;

changing the graphical indicator of the selected zone in response to determining that the user has selected the fourth user interface element, wherein the graphical indicator is updated to indicate that the quality control closure state of the selected zone is now closed;

changing the graphical indicator of the selected zone in response to determining that the user has selected the fifth user interface element, wherein the graphical indicator is updated to indicate that the quality control closure state of the selected zone is now open; and updating the assembly history database with a change corresponding to the selected zone and its present quality control closure state.

13. The method of claim 12, wherein the method further comprises automatically determining whether the quality control closure state of a selected zone can be changed to closed and trigger a process for closing the zone by a user.

14. The method of claim 13, wherein the method further comprises:

continuously monitoring the assembly progress report of every zone stored in the assembly history database;

wherein upon determining that every action item on the assembly progress report has been completed for one or more zones, triggering the process for closing the selected zone by an aircraft assembly worker; and wherein the user operates the user interface to display the one or more zones and its corresponding assembly progress report, and selects the fourth user interface element to apply a virtual quality control stamp to the one or more zones.

15. The method of claim 10, wherein the diagram of the at least one selected part of an aircraft under assembly is an up-to-date diagram of the at least one selected part, including any changes to the quality control closure state of any of the displayed zones that have been made since the selected part first began assembly.

16. One or more non-transitory computer readable media storing instructions that, when executed by one or more computers, cause the one or more computers to perform operations comprising:

displaying, on a user interface, an up-to-date diagram of at least one selected part of an aircraft under assembly, wherein displaying the diagram comprises displaying a plurality of zones overlaid on a graphical representation of the selected part, and for a zone, a graphical indicator that indicates a quality control closure state of the zone;

receiving user input selecting a first zone of the plurality of zones;

in response to receiving the user input, accessing an assembly history database for the aircraft to retrieve an assembly progress report for the first zone, wherein the assembly progress report for the first zone comprises a plurality of action items;

displaying, on the user interface, at least a first portion of the assembly progress report, comprising any completed or non-completed action items;

receiving further user input selecting at least a second portion of the assembly progress report, comprising one or more non-completed action items, for completion; and in response to receiving the further user input, accessing the assembly history database for the aircraft, and update the assembly progress report for the first zone to indicate that at least the second portion of the action items on the assembly progress report have been completed.

17. The computer readable media of claim 16, wherein the assembly history database comprises:

a list of one or more aircraft;

a list of one or more aircraft parts for each of the one or more aircraft;

a list of a plurality of zones associated with each aircraft part; and an assembly progress report for each of the zones;

wherein the user interface comprises a first user interface element for selecting an aircraft from the list of one or more aircraft, a second user interface element for selecting a part for the selected aircraft, and a third user interface element for selecting a zone for the selected aircraft part.

18. The computer readable media of claim 16, wherein the operations further comprise:

managing a list of one or more virtual quality control stamps;

wherein the user interface comprises a fourth user interface element for attaching a virtual quality control stamp to the zone and a fifth user interface element for removing the virtual quality control stamp from the zone;

wherein displaying the graphical indicator comprises shading the plurality of zones to indicate the quality control closure state of the plurality of zones and thus whether the virtual quality control stamp has been attached to the plurality of zones; and wherein the user interface is further configured for:

receiving an additional user input on the fourth user interface element to attach the virtual quality control stamp, or on the fifth user interface element to remove the virtual quality control stamp to a selected zone;

receiving an additional user input on a sixth user interface element to display key performance indicators such as a graph or chart showing a history of a number of zones completed on the aircraft part as well as a prediction of a date on which the aircraft part will be done with assembly;

changing the graphical indicator of the zone in response to determining that the user has selected the fourth user interface element, wherein the graphical indicator is updated to indicate that the quality control closure state of the zone is now closed;

changing the graphical indicator of the selected zone in response to determining that the user has selected the fifth user interface element, wherein the graphical indicator is updated to indicate that the quality control closure state of the selected zone is now open; and updating the assembly history database with a change corresponding to the selected zone and its present quality control closure state.

19. The computer readable media of claim 16 wherein the computer is further configured to automatically determine whether the quality control closure state of the selected zone can be changed to closed and trigger a process for closing the zone by a aircraft assembly worker;

wherein each zone corresponds to a portion of the aircraft part that, in assembly, will be closed by a panel; and wherein a closed quality control closure state specifies that the action items for a zone are complete, that the panel has been physically secured to the aircraft part, and that an aircraft assembly worker has supplied a virtual stamp to the zone.

20. The computer readable media of claim 19, wherein the computer is configured to continuously monitor the assembly progress report of every zone stored in the assembly history database;

wherein the computer is configured to trigger, upon determining that every action item on the assembly progress report has been completed for one or more zones, the process for closing the first zone by the aircraft assembly worker; and wherein the user interface is configured to display the one or more zones and their corresponding assembly progress report to the aircraft assembly worker, and receive a selection from the aircraft assembly worker, using the fourth user interface element, to apply a virtual quality control stamp to the one or more zones.

21. The one or more computers of claim 16, wherein the one or more computers comprises:

a server comprising at least one processor and memory storing executable instructions for the at least one processor;

one or more communication elements implemented on the at least one processor, configured to communicate with the user interface operating on one or more computers; and one or more databases.

\* \* \* \* \*